July 19, 1927. 
C. H. MICKELSEN
1,636,312
GAMBREL
Filed June 8, 1925
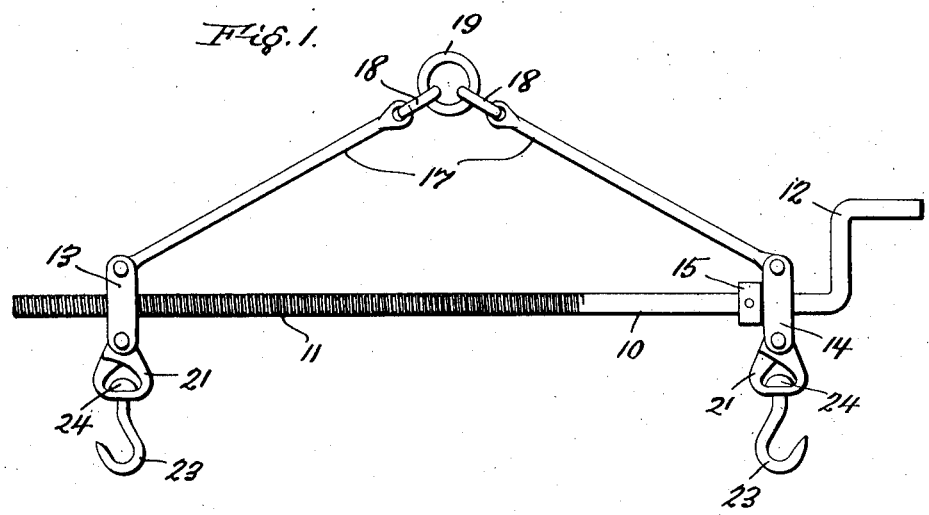
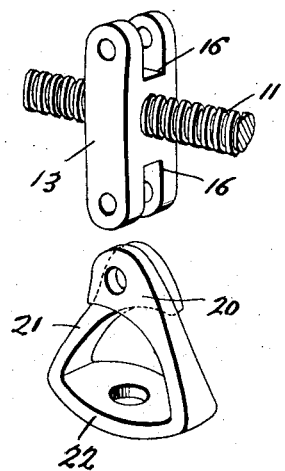
Canute H. Mickelsen
INVENTOR
BY Victor J. Evans
ATTORNEY
WITNESS: Gerald Hennessy Patented July 19, 1927.

1,636,312

UNITED STATES PATENT OFFICE.

CANUTE H. MICKELSEN, OF TETONIA, IDAHO, ASSIGNOR TO MICKELSEN PATENTS CO. INC., OF DRIGGS, IDAHO.

GAMBREL.

Application filed June 8, 1925. Serial No. 35,653.

This invention relates to improvements in adjustable means for use upon gambrels used on ranches and in slaughtering houses and contemplates the provision of a bar having a threaded portion extending an appreciable length thereon which carries upon its threaded portion a cleat member having a hook upon its lower end while a companion cleat is arranged upon the smooth surface of the bar and each of the cleats are connected to pivoted bars and a singular link for supporting the same when used for the purpose intended.

Another object of my invention is the provision of a handle formed upon one end of the bar and which when rotated will move the cleats to and from each other for stretching a beef, hog and the like and aiding the butcher in splitting the same as well as supporting an animal upon each of the hooks carried by the cleat so that they may be arranged in spaced relation.

With the above and other objects in view, the invention further includes the following novel features and details of construction, to be hereinafter more fully described, illustrated in the accompanying drawing and pointed out in the appended claims.

In the drawing:—

Figure 1 is an elevation of my invention.

Figure 2 is a perspective of a section of the threaded portion of the bar and clevis arranged thereon, and the hook support.

Referring to the drawing in detail, wherein like characters of reference denote corresponding parts, the reference character 10 indicates a bar, a portion of which is provided with squared threads 11 while the opposite end of the bar 10 terminates in the handle portion 12. Traveling and stationary blocks 13 and 14 are received upon the threaded portion 11 of the bar 10, the stationary block 14 being held against sliding movement upon the bar 10 by a fixed collar 15. Both of these blocks being correspondingly shaped and including bifurcated end portions 16 to form spaced perforated ears. A pair of rods 17 have their lower ends pivotally connected between the ears of the end portions 16 of the blocks 13 and 14 respectively, while links 18 are connected to their upper ends and each of which is connected to a common supporting ring 19.

Pivotally connected within the lower bifurcated portions 16 of the traveling and stationary blocks 13 and 14 respectively are the upper apertured end portions 20 of a stirrup 21 having a relatively large apertured lower portion 22. A pair of hooks 23 have their upper ends extending within the lower enlarged apertured portion 22 and including headed portions 24 thereon to prevent accidental displacement therefrom and yet permit of a free pivotal movement within these portions of the stirrup 21.

In the mode of operation of the present invention it is clearly apparent that after the supporting ring 19 is supported upon a hook, nail or other fastening element, that upon successive rotations of the bar 10 the traveling block 13 will be caused to move and travel in opposite directions upon the squared threaded portion 11 of the bar 10, according to whether the bar 10 is rotated in either a clockwise or counter-clockwise movement. It will be further noted that owing to this novel construction and arrangement of parts a beef, hogs and the like when having their hind legs pierced and supported by the hooks 23 and upon a counter-clockwise movement of the handle 12 of the bar 10 that the said legs of the animal will be spread apart in order to facilitate the easy splitting thereof.

The invention is susceptible of various changes in its form, proportions and minor details of construction, and the right is herein reserved to make such changes as properly fall within the scope of the appended claims.

Having described my invention what I claim is:

1. A gambrel of the character described comprising a bar having a squared threaded portion upon one end and a smooth crank portion upon the opposite end, traveling and stationary blocks received on the squared threaded portion and smooth crank portion of the bar respectively, a collar fixed to the smooth crank portion of the bar for retaining the stationary block against sliding movement, each of the blocks terminating in bifurcated and apertured end portions respectively, a pair of stirrups having their upper ends apertured and pivotally connected within the lower bifurcated ends of the blocks, a pair of hooks having their upper ends pivoted within the lower portion of the stirrups, a pair of rods having their lower ends pivoted within the bifurcated ends of the blocks, a pair of links connected to the upper free ends of the rods, and a common supporting ring receiving the links therein.

2. A gambrel of the character described comprising a bar having a threaded portion upon one end and a smooth crank portion upon the opposite end, traveling and stationary blocks received on the threaded portion and smooth crank portion of the bar respectively, a collar fixed to the smooth crank portion of the bar for holding the stationary block against sliding movement, each of the blocks terminating at each end to form bifurcated end portions providing spaced perforated ears, a pair of stirrups having their upper ends apertured and pivotally connected between the spaced ears at the lower ends of the blocks, a pair of hooks having their upper ends pivoted within the lower portion of the stirrups, a pair of rods having their lower ends pivoted between the spaced ears at the upper ends of the blocks, a pair of links connected to the upper free ends of the rods, and a common supporting ring receiving the links therein.

In testimony whereof I affix my signature.

CANUTE H. MICKELSEN.